United States Patent
Jun et al.

(10) Patent No.: US 11,432,114 B1
(45) Date of Patent: Aug. 30, 2022

(54) SMS MESSAGING

(71) Applicant: Kigen (UK) Limited, Cambridge (GB)

(72) Inventors: Jerry Chun-Pai Jun, Austin, TX (US); Robin Owain Jones, Crumlin (GB)

(73) Assignee: Kigen (UK) Limited, Cambridge (GB)

( * ) Notice: Subject to any disclaimer, the term of this patent is extended or adjusted under 35 U.S.C. 154(b) by 0 days.

(21) Appl. No.: 17/193,351

(22) Filed: Mar. 5, 2021

(51) Int. Cl.
  *H04W 4/14*   (2009.01)
  *H04W 12/033*  (2021.01)

(52) U.S. Cl.
  CPC ........... *H04W 4/14* (2013.01); *H04W 12/033* (2021.01)

(58) Field of Classification Search
  CPC .............................. H04W 4/14; H04W 12/033
  USPC ........................................................ 455/410
  See application file for complete search history.

(56) References Cited

U.S. PATENT DOCUMENTS

| | | | | |
|---|---|---|---|---|
| 2009/0013087 A1* | 1/2009 | Lorch | ............... | H04M 1/72436 709/232 |
| 2012/0309341 A1* | 12/2012 | Ward | .................... | H04W 4/029 455/404.2 |
| 2013/0282838 A1* | 10/2013 | Zhu | .......................... | H04L 51/12 709/206 |
| 2019/0149991 A1* | 5/2019 | Conil | .................. | H04L 63/0815 455/411 |

\* cited by examiner

*Primary Examiner* — Joel Ajayi
(74) *Attorney, Agent, or Firm* — Nixon & Vanderhye P.C.

(57) ABSTRACT

A data processing apparatus is provided that includes message obtaining circuitry that obtains, for transmission over a first cellular communication channel to an endpoint device, an outgoing SMS message containing an encrypted payload and an identifier corresponding to the endpoint device. Extraction circuitry extracts the encrypted payload from the outgoing SMS message and produces an extracted encrypted payload, and extracts the identifier corresponding to the endpoint device from the outgoing SMS message. Wrap circuitry wraps bytes that make up the SMS message in an outgoing data packet and communication circuitry transmits, to the endpoint device or a server, the outgoing data packet on a second data communication channel. The outgoing data packet is of a type other than an SMS message.

14 Claims, 6 Drawing Sheets

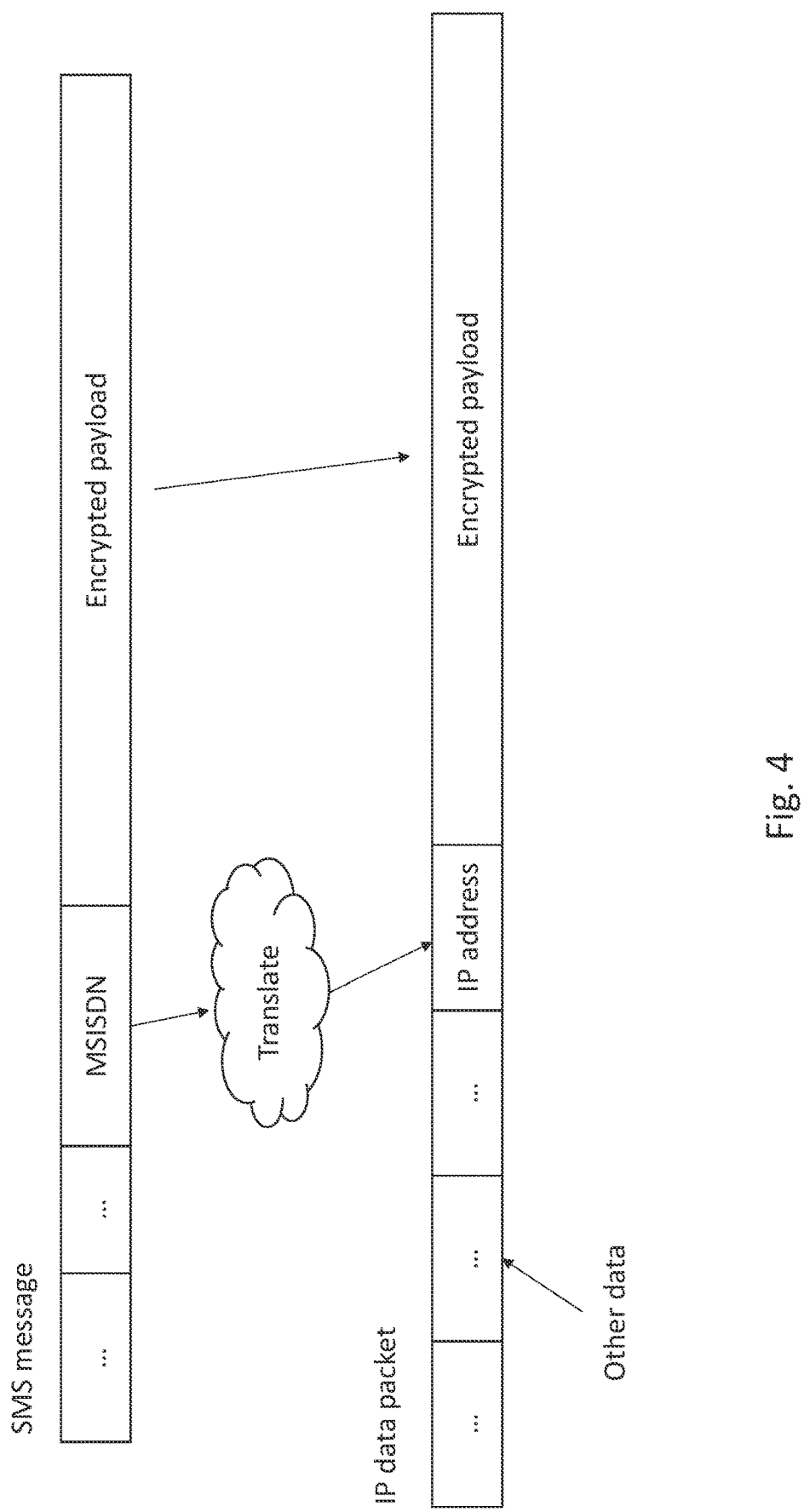

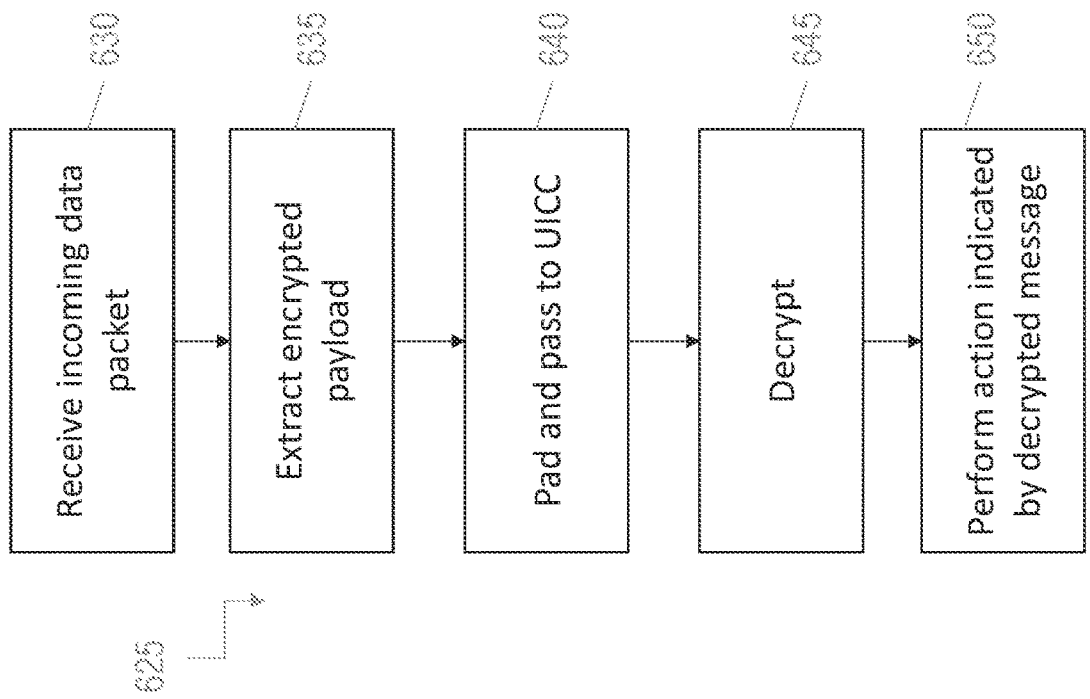
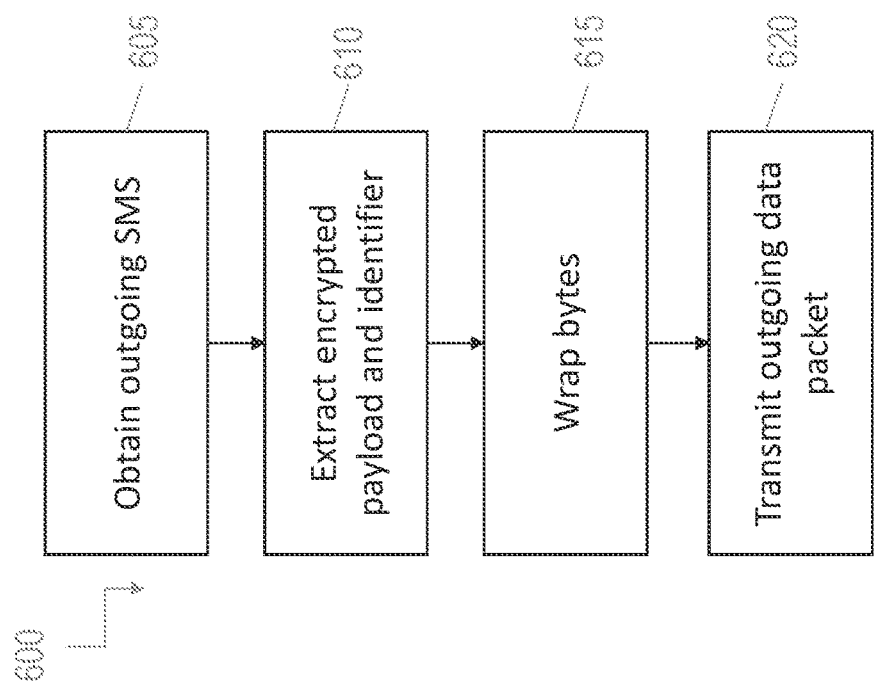
Fig. 6

SMS MESSAGING

TECHNICAL FIELD

The present disclosure relates to data processing.

DESCRIPTION

Short Message Service (SMS) messages are often used to communicate with profiles on devices in networks. However, the SMS delivery can be unreliable and in certain networks, might not be available at all.

SUMMARY

Viewed from a first example configuration, there is provided a data processing apparatus comprising: message obtaining circuitry configured to obtain, for transmission over a first cellular communication channel to an endpoint device, an outgoing SMS message comprising an encrypted payload and an identifier corresponding to the endpoint device; extraction circuitry configured to extract the encrypted payload from the outgoing SMS message to produce an extracted encrypted payload, and to extract the identifier corresponding to the endpoint device from the outgoing SMS message; wrap circuitry configured to wrap bytes that make up the SMS message in an outgoing data packet; and communication circuitry configured to transmit, to the endpoint device or a server, the outgoing data packet on a second data communication channel, wherein the outgoing data packet is of a type other than an SMS message.

Viewed from a second example configuration, there is provided a data processing method comprising: obtaining, for transmission over a first cellular communication channel to an endpoint device, an outgoing SMS message comprising an encrypted payload and an identifier corresponding to the endpoint device; extracting the encrypted payload from the outgoing SMS message to produce an extracted encrypted payload; extracting the identifier corresponding to the endpoint device from the outgoing SMS message; wrapping bytes that make up the SMS message in an outgoing data packet; and transmitting, to the endpoint device, the outgoing data packet on a second data communication channel, wherein the outgoing data packet is of a type other than an SMS message.

Viewed from a third example configuration, there is provided a data processing apparatus comprising: receiving circuitry to receive an incoming data packet on an data communication channel; extraction circuitry to extract an encrypted payload from the incoming data packet to produce an extracted encrypted payload, wherein the encrypted payload and the extracted encrypted payload are both encrypted based on a cellular communication protocol; pad circuitry to pad the extracted encrypted payload with header data to form an encrypted SMS message; and modem circuitry to receive the encrypted SMS message and to pass to a UICC application, to decrypt the encrypted SMS message to produce a decrypted message and to perform an action indicated by the decrypted message.

Viewed from a fourth example configuration, there is provided a data processing method comprising: receiving an incoming data packet on an data communication channel; extracting an encrypted payload from the incoming data packet to produce an extracted encrypted payload, wherein the encrypted payload and the extracted encrypted payload are both encrypted based on a cellular communication protocol; padding the extracted encrypted payload with header data to form an encrypted SMS message; passing the encrypted SMS message to a UICC application to decrypt the encrypted SMS message to produce a decrypted message; and performing an action indicated by the decrypted message.

BRIEF DESCRIPTION OF THE DRAWINGS

The present invention will be described further, by way of example only, with reference to embodiments thereof as illustrated in the accompanying drawings, in which:

FIG. 4 illustrates a number of ways in which conversion of the SMS message to an outgoing data packet can occur;

FIG. 6 illustrates a pair of flowcharts that show a method performed by each of the sender and receiver in accordance with some examples.

DESCRIPTION OF EXAMPLE EMBODIMENTS

Figure 1:
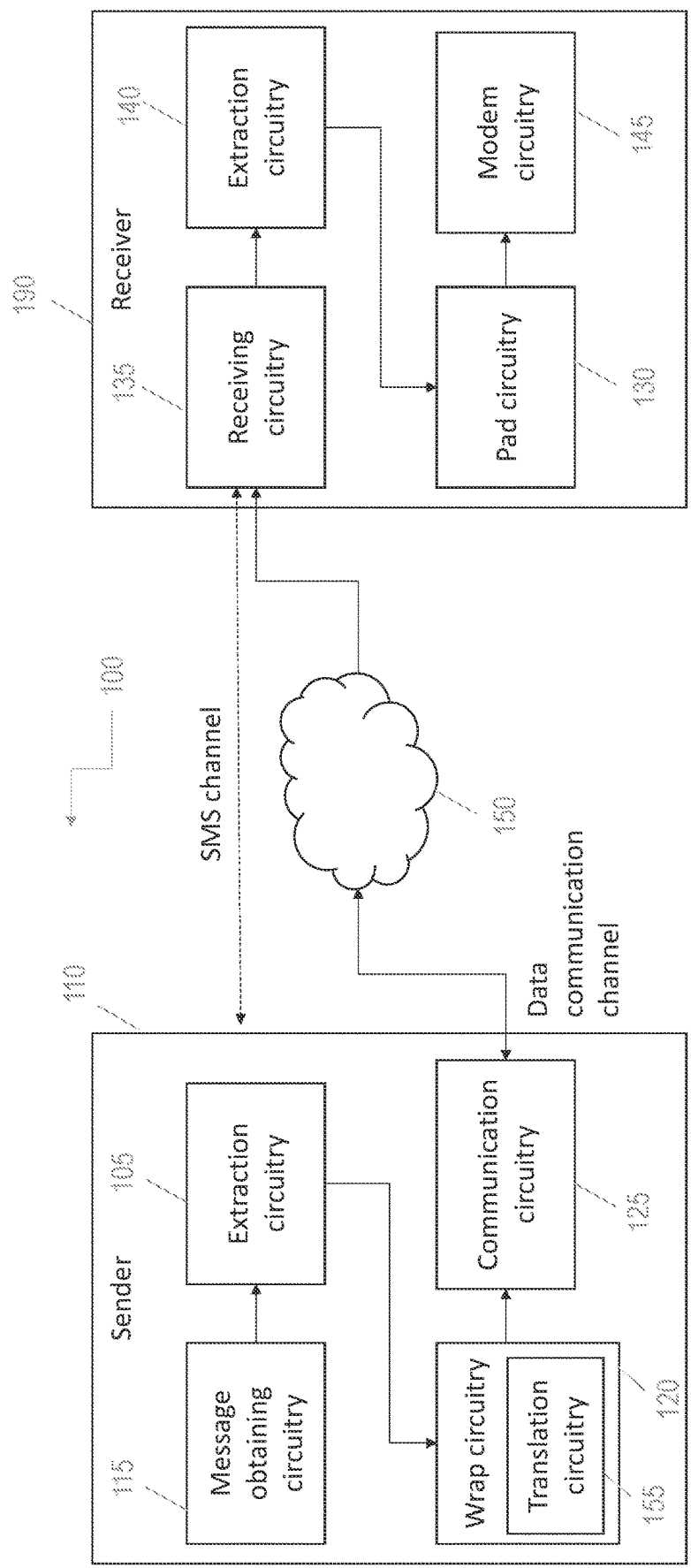
FIG. 1 shows an example system containing a sending device and a receiving device in accordance with some embodiments.

Before discussing the embodiments with reference to the accompanying figures, the following description of embodiments is provided.

In accordance with one example configuration there is provided a data processing apparatus comprising: message obtaining circuitry configured to obtain, for transmission over a first cellular communication channel to an endpoint device, an outgoing SMS message comprising an encrypted payload and an identifier corresponding to the endpoint device; extraction circuitry configured to extract the encrypted payload from the outgoing SMS message to produce an extracted encrypted payload, and to extract the identifier corresponding to the endpoint device from the outgoing SMS message; wrap circuitry configured to wrap bytes that make up the SMS message in an outgoing data packet; and communication circuitry configured to transmit, to the endpoint device or a server, the outgoing data packet on a second data communication channel, wherein the outgoing data packet is of a type other than an SMS message.

The SMS message is firstly obtained. This could occur as a consequence of the SMS message being locally generated (e.g. on the data processing apparatus itself) or could be as a consequence of the SMS message being generated elsewhere and being intercepted by the data processing apparatus (e.g. via the message obtaining circuitry). In any event, the intended end target of the SMS message is an endpoint device. An identifier of the endpoint device and the encrypted payload of the SMS message are both extracted by extraction circuitry. The identifier that corresponds to the endpoint device is intended to indicate where an SMS message is to be directed to. This could be a device identifier or could be an identifier that is assigned to the device (e.g. temporarily) for instance. At least some of the bytes that make up the extracted encrypted payload are then wrapped up in order to form an outgoing data packet. The outgoing data packet is then communicated on a second data communication channel either directly to the endpoint device, or to a server that can act as one (of possibly several) intermediaries on the way to the endpoint device. The type of the outgoing message is something other than an SMS message. In this way, the encrypted contents of the SMS message are effectively transmitted over another, different, communication channel. This is achieved without necessitating the SMS message being decrypted (which would require the data processing apparatus to have access to the relevant keys). The content of the SMS message can then be transmitted reliably. Note that although an SMS message is obtained, there is no need for the data processing apparatus to have access to an SMS channel. The outgoing data packet is of a type other than an SMS message. That is to say that the data packet is not an SMS message. The second channel (i.e. the data channel) could for instance be an IP data channel.

In some examples, the extraction circuitry is configured to extract only the encrypted payload and the identifier corresponding to the endpoint device from the outgoing SMS message. In these examples, there is no need for remaining parts of the outgoing SMS message to be accessed in order to form the outgoing data packet.

In some examples, the wrap circuitry is configured to generate the outgoing data packet using only the identifier corresponding to the endpoint device and the encrypted payload from the outgoing SMS message, or data from outside the outgoing SMS message. Here, the outgoing data packet does not use other elements of the SMS message in order to form the outgoing data packet. That is to say that other data from outside the outgoing SMS message may be used in addition to the identifier and/or encrypted payload, but other elements of the SMS message itself are not used to form the outgoing data packet.

In some examples, the wrap circuitry comprises translation circuitry to translate the identifier corresponding to the endpoint device to an alternative identifier corresponding to the endpoint device to be used in the outgoing data packet. In these examples, a translation is performed between the identifier in the outgoing SMS message (which is an identifier used for a cellular communication channel) and the alternative identifier that is used in the outgoing data packet (which is an identifier used for a data communication channel). In other embodiments, the identifier and the alternative identifier could be the same—for instance, the alternative identifier in the outgoing data packet could be swapped for a further alternative identifier during transport by a device that performs this translation after the outgoing data packet has been sent.

In some examples, at least one of the identifier corresponding to the endpoint device and the alternative identifier corresponding to the endpoint device is a subscriber identifier. The subscriber identifier can be used to uniquely identify a particular connection, account, or user.

In some examples, the identifier corresponding to the endpoint device is one of: an MSISDN (Mobile Subscriber Integrated Services Digital Network Number), an ICCID (Integrated Circuit Card Identifier), an IMSI (International Mobile Subscriber Identity), and an eUICCID (embedded Universal Integrated Circuit Card Identifier). These are all examples of subscriber identifier, which can be used to identify a particular connection, account, or user.

In some examples, the transmission circuitry is further configured to transmit, to the endpoint device, the outgoing SMS message. In addition to transmitting the data packet that contains the encrypted SMS payload, the SMS message itself is sent towards the endpoint device (e.g. in parallel).

This enables two different routes or channels to be used for transmitting the payload to the endpoint device, thereby increasing the chance with which it will arrive at the endpoint and making it possible to take advantage of one of the channels having a faster transmission speed. Since SMS payloads use nonces (in the form of counters), the later arriving message will simply be disregarded when/if it arrives.

In some examples, the communication circuitry is configured to transmit the outgoing data packet to the endpoint device via the server; and the server is an endpoint device management service. In these examples, the outgoing data packet is sent indirectly to the endpoint device via a server in the form of an endpoint device management service. Such a management service might be responsible for managing a flow of data to/from the endpoint service, which might include the opening of further data channels to/from the endpoint service, for instance.

In some examples, the communication circuitry is further configured to communicate a further data packet via the server on the second data communication channel; and the further data packet is for managing the transmission of data to or from the data processing apparatus. The further data packet could be a MQTT, HTTP, CoAP, mott, XMPP, AMQP, DDS, lwm2m packet (e.g. over an IP data channel), TCP or UDP. The further data packet could alternatively be sent over Non-IP Data Delivery (NIDD) service paths. In some embodiments, the second data communication channel is used to send data other than encrypted SMS payloads. The data processing apparatus is thereby able to make use of a second data communication channel that is used for sending further data packets that manage the transmission of data from the data processing apparatus in order to transmit the encrypted SMS payloads.

In some examples, the server is configured to act as a broker as part of a data push communication system or as part of a data pull communication system. Examples of push data communication systems include publish/subscribe mechanisms in which devices can subscribe to particular categories of data at the broker, which then supplies any relevant published data to the subscribers. Examples of pull communication systems include put/post/patch/get mechanisms in which the client actively retrieves data from the broker. In both cases, there is no need for the data providers to have knowledge of the devices that desire particular data (or vice versa). An example of a publish/subscribe service is Message Queuing Telemetry Transport (MQTT).

In some examples, the encrypted payload and the extracted encrypted payload correspond to a secured operation for a UICC application. For instance, the encrypted payload and the extracted encrypted payload could correspond to a Remote SIM Provisioning (RSP) operation, which allows a Subscriber Identity Module (SIM) to be remotely activated, which may result in the activation of a data channel (e.g. a UDP or TCP channel). Another example of a secured operation for a UICC application could be a SIM over-the-air management, in which the encrypted payload contains commands and/or scripts for remote file or application management.

In some examples, the message obtaining circuitry is configured to obtain the outgoing SMS message by interception over an SMPP protocol link. There are a number of ways in which the SMS message can be obtained. In these examples, the SMS message is obtained from an external device over a Standard Telecom SMS Peer to Peer (SMPP) link. In some other examples, the message obtaining circuitry is configured to obtain the outgoing SMS from an SMS-enabled device; and the SMS-enabled device is an SMS message submission device. The SMS-enabled device could be a device that is involved in message submission External Short Message Entity (ESME) to SMS Centre transmission) or in message delivery (SMS Centre towards Network/UE). SMS messages can be transmitted over a core network via Mobile Application Part (MAP), Signalling Gateways Application Protocol (SGsAP) and MAP, Diameter, IP Short Message Gateway (IP-SM-GW), or Machine Type Communications-Interworking Function (MTC-IWF), for example.

In accordance with another example configuration, there is provided a data processing apparatus comprising: receiving circuitry to receive an incoming data packet on a data communication channel; extraction circuitry to extract an encrypted payload from the incoming data packet to produce an extracted encrypted payload, wherein the encrypted payload and the extracted encrypted payload are both encrypted based on a cellular communication protocol; pad circuitry to pad the extracted encrypted payload with header data to form an encrypted SMS message; and modem circuitry to receive the encrypted SMS message and to pass to a UICC application, to decrypt the encrypted SMS message to produce a decrypted message and to perform an action indicated by the decrypted message.

In this other example configuration, the incoming data packet is received over a data communication channel. As described above, such a message could be received using a variety of protocols such as MQTT, HTTP, CoAP, mott, AMQP, XMPP, DDS or lwm2m and the packet could be sent over NIDD, TCP or UDP. The extraction circuitry extracts the encrypted payload from the incoming packet. This is the encrypted payload that was originally part of an SMS message before being extracted by the previously described data processing apparatus. The encrypted payload is therefore encrypted according to a cellular communication protocol. Pad circuitry is provided to reform an encrypted SMS message using the encrypted payload and adding, e.g. header information. The reformed encrypted SMS message is then provided to the modem circuitry to pass to the corresponding UICC application. The UICC application is therefore made to believe that the encrypted SMS message has been received across a conventional SMS channel. The UICC application decrypted the encrypted SMS message to produce a decrypted message and performs an action indicated by the decrypted message. Consequently, the data processing apparatus of this example configuration can be made to act on an encrypted SMS message without the SMS message being transmitted across the SMS channel, which might be unstable or unavailable. Operations that are conventionally performed using an SMS channel (such as RSP operations or other management operations) can therefore be achieved without the need for the SMS channel.

In some examples, the data processing apparatus comprises receipt circuitry to generate a delivery report to provide a proof of receipt of the incoming data packet in response to the incoming data packet being received on the data communication channel. A delivery report can act as a proof that the incoming data packet was received by the data processing apparatus. The delivery report can be sent over the data communication channel that was used to receive the incoming data packet.

Particular embodiments will now be described with reference to the figures.

FIG. 1 shows an example system 100 containing a sending device 110 and a receiving device 190 in accordance with some embodiments. The receiver device might be a cellular device that is capable of operating on one or more cellular networks. On the device, one or more profiles are provided, that include connection information (such as a subscriber identity) for a particular network operator. Consequently, by storing multiple profiles on the receiver device, it is possible for the receiver device to change between network operators by selectively enabling or disabling profiles. In addition, profiles could be dynamically added and/or deleted to provide connectivity to a new network operator. Operations that enable/disable/download/delete/audit profiles are part of a class of operations known as Remote Sim Provisioning (RSP) which are themselves part of a class of secured operation that might be performed in a system of this kind. The device may include one or more security modules such as a Universal Integrated Circuit Cards (UICCs) or a Subscriber Identity Module (SIM) that can store the profiles. The sending device 110, in this example, seeks to send a secured operation for a UICC application, such as an RSP operation to the receiver 190, e.g. to enable a profile stored on the receiver, causing a data channel to be opened up. The sender 110 might ordinarily seek to use an SMS channel for this process, and indeed, the secured operation might only be supported using an SMS message to transmit the details of the operation to be performed. However, in this example, the SMS channel is unreliable (shown as a dashed line in FIG. 1).

In order to cause the RSP operation to be performed, the sender 110 obtains an SMS message corresponding to the RSP operation to be performed using message obtaining circuitry 115. This might occur as a consequence of the sender 110 generating the SMS message or it could occur as a consequence of the sender 110 being sent the SMS message by another device. In any event, the message is passed to the extraction circuitry 105 where a payload of the SMS message is extracted from the SMS message. In this example, the payload is encrypted using a cellular protocol and, lacking access to the keys for decryption, the payload cannot be decrypted. In addition, an identifier of the receiver 190 is obtained. This identifier could, for instance, be a subscriber identifier such as an MSISDN that has been allocated to the receiver. The extracted encrypted payload and identifier of the receiver 190 are passed to wrap circuitry 120, which may optionally contain translation circuitry 155. In any event, an outgoing data packet is generated that contains the encrypted SMS payload, which is sent to the receiver 190 via a data communication channel. In this example, the outgoing data packet is sent via a server 150 such as a device management server. However, in other examples, the outgoing data packet could be sent to the receiver 190 directly using the data communication channel.

At the receiver 190 side, the outgoing data packet is received by receiving circuitry 135, and passes the packet to extraction circuitry 140. The extraction circuitry extracts the encrypted SMS payload from the received data packet, and passes the payload to the pad circuitry 130. Note that the extraction circuitry may not be able to simply decrypt the SMS payload, because the keys for the decryption may be kept confidential. The pad circuitry 130 then generates an SMS message using the SMS payload data, e.g. by adding headers to the message. The newly generated SMS message is then passed to the modem circuitry 145 where the decryption can be made to happen as if the SMS message had been received via an SMS channel. Any operations that are indicated by the payload can then be performed. In this way, the system is able to give the illusion of the SMS message being transmitted even though the SMS channel is unreliable.

In response to receiving the data packet at the receiver, the receiver might send an acknowledgement back to the sender via the data channel.

Figure 2:
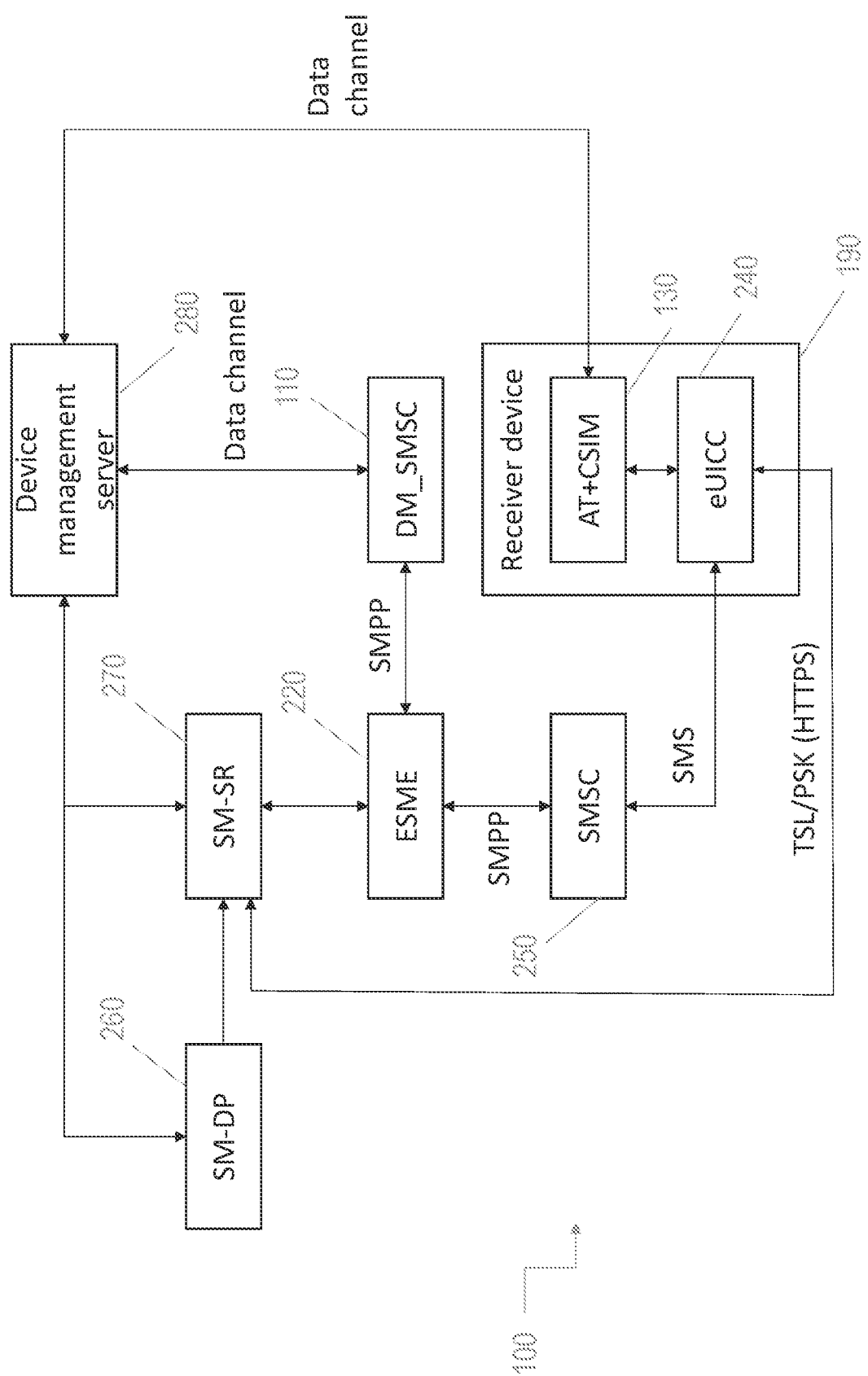
FIG. 2 illustrates some examples of the present technique in more detail.

FIG. 2 illustrates some examples of the present technique in more detail. A device management server 280 is provided, which forms part of a device management system configured to control and manage the devices such as receiver device 190 by the exchange of SMS messages. Such SMS messages may be used by themselves to implement simple commands, such as to switch to a different profile already stored on the device 190, or to delete a profile. If more complex functions are needed, for example to download a new profile, then an SMS message may be used as an initial command, and could for example be used to instruct the security module to open a TLS (Transport Layer Security) session via which the new profile can then be downloaded. Ordinarily, the SMS messages can be routed using Subscription Manager Secure Routing (SM-SR) servers, which to provide a secure path for accessing a particular device and Subscription Manager Data Preparation (SM-DP) servers that acts as a database of encrypted material relating to profiles.

Ordinarily, a management message such as an RSP message could be sent via Short Message Peer to Peer Protocol (SMPP) from an External Short Message Entity (ESME) 220, which performs routing of SMS messages to/from the SMS Centre (SMSC) 250 to/from the embedded Universal Integrated Circuit Card (eUICC) 240 to/from the receiver device 190 in order to cause a new channel TSL/PSK (HTTPS) to be opened from the receiver device 190 back to the SM-SR 220.

However, in this example, it is assumed that one or more parts of this link outside the device 190 are unreliable.

In the present examples, the ESME 220 generates the SMS message, which is transmitted to DM_SMSC 110, which is an example of the previously described sending device. In this particular example, therefore, the obtaining circuitry 115 of the sender 110 obtains the SMS message via SMPP 220 from the ESME 220 (although other protocols might also be usable). The 'conversion' process previously described is performed, resulting in an outgoing data packet being generated and sent towards the device management server 280 which forms part of a device management system configured to control and manage the devices. The device management server 280 uses a data channel that is established with the receiver device 190 to communicate the outgoing data packet. The data channel could be used for a variety of purposes. For instance, the channel may already be used for transmitting data to/from the device management server 280 and the receiver device 190, e.g. for the purposes of managing or controlling the device and/or for service enablement for the device. For example, the established data channel may be a device management protocol that operates a push or pull data communication model. The data communication channel may, for example, use application layer protocols such as Lightweight M2M over CoAP or MQTT, or may use other such Machine to Machine IoT protocols such as one M2M. Various different protocols could be implemented to support the previously described types of data packet. Example transport layers for the IP data channel include TCP or UDP. The AT+CSIM circuitry 130 receives the data packet and passes this to the eUICC 240 to cause software on the eUICC 240 to decrypt the payload of the data packet (e.g. the encrypted SMS payload) and to cause an operation to occur based on an indication of that payload, e.g. by activating a new TSL/PSK (HTTPS) channel to the SM-SR 270. Thus, the new channel can be activated, normally requiring an SMS message to be transmitted, even though the SMS channel is not available. The endpoint device management service is responsible for managing the endpoint device (e.g. receiver 190). This could involve managing a flow of data to the receiver 190 or could relate to supervisory capabilities over the receiver 190.

Figure 3:
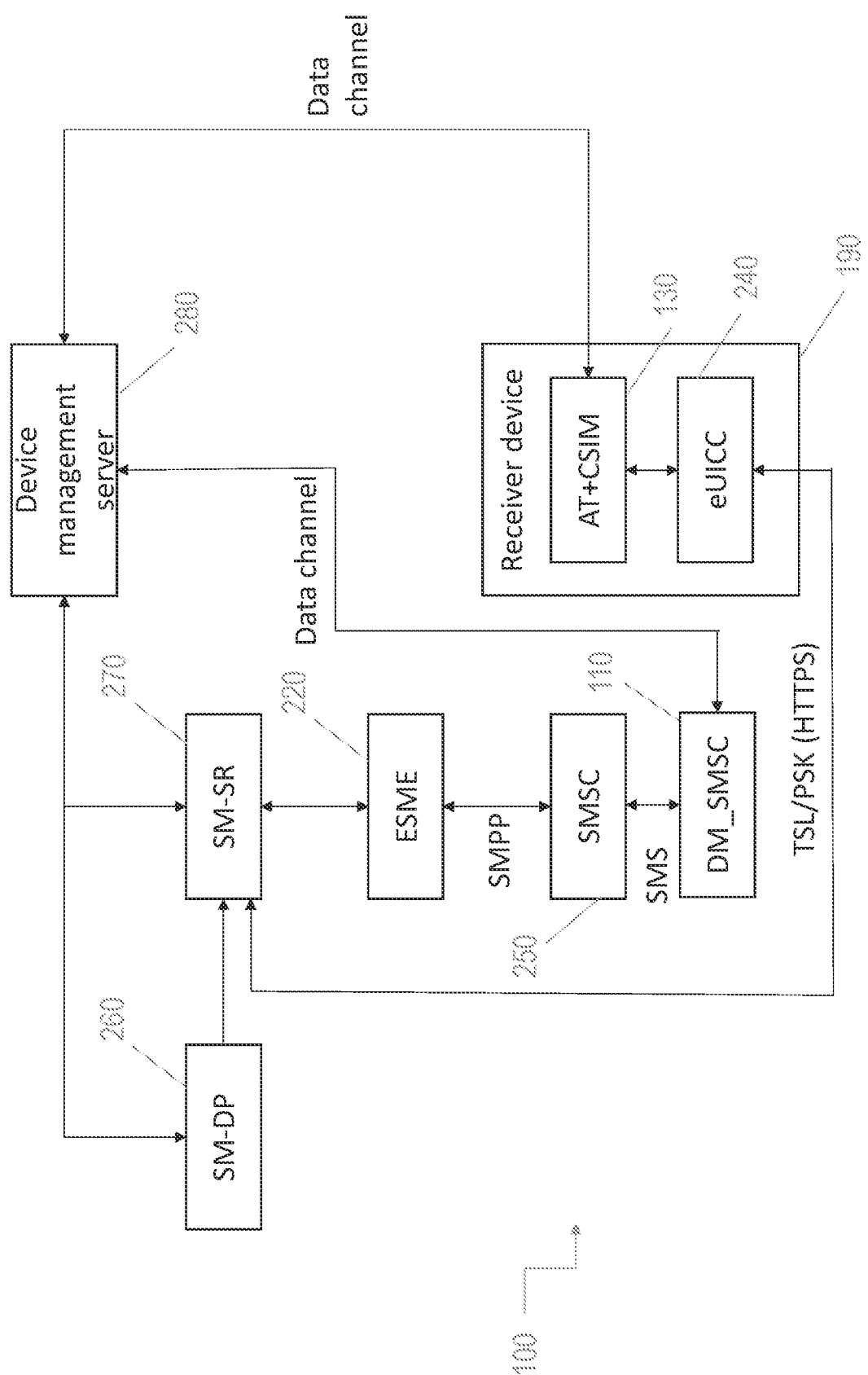
FIG. 3 shows a variant configuration in which the ESME transmits the SMS message to the SMSC.

FIG. 3 shows a variant configuration in which the ESME 220 transmits the SMS message to the SMSC 250. This then causes an SMS message to be generated, which is intercepted by the DM_SMSC 110 (e.g. on behalf of the receiver device 190). The rest of the process then proceeds as previously explained in which the DM_SMSC 110 makes use of a data channel to transmit a data packet to the device management server 280.

In yet another example, modifying either of FIG. 2 or FIG. 3, the device management server 280 might not be provided. Here, the sender device 110 itself might have a direct connection to the receiver device 190 via its own data channel. Any of the data channels could, for example, be an IP data channel. In this case, the outgoing data packet may take the form of an outgoing IP data packet.

FIG. 4 illustrates a number of ways in which conversion of the SMS message to a data packet can occur. In FIG. 4, an SMS message is illustrated, which contains a number of field. For instance, the SMS message is shown to contain an encrypted payload and a subscriber identity in the form of an MSISDN, which acts as an identifier for the receiver 190. Other fields might also exist. In these examples, only the encrypted payload and the MSISDN are used from the SMS message in order to generate the outgoing data packet. Other data from outside the SMS message might also be used in one or more of the fields.

It may be desirable to translate the identifier corresponding to the receiver 190 as it is obtained from the SMS message, to an alternative identifier associated with the receiver 190 that is appropriate for the data channel. In particular, the identifier used in an SMS message might be a subscriber identifier that identifies a user or an account rather than a particular device. If a user has multiple cellular devices then the subscriber identifier might be moved between them when one of the devices is made 'active'. This differs from a device identifier that is used to identify a particular piece of hardware, regardless of the user or account with which it is currently associated. The translation step, as well as providing a translation that is suitable for the type of network on which the outgoing data packet is being transmitted, might also be used to translate a subscriber identity (such as an MSISDN) to a device identity (such as an IP address or MAC address). This translation can be performed by translation circuitry 155, e.g. in the wrap circuitry 120 of the sender 110. However, such translation could also occur in another device in the network such as at the device management server 280. In some examples, the MSISDN (or other identifier that is present in the SMS message) could also be used to identify the receiver device 190 in the outgoing data packet. In still other examples, if the identity of the receiver device 190 is unambiguous, then no identifier may be provided at all. Of course, transport rules regarding identifiers that are required by the data channel may still have to be obeyed.

Figure 5A:
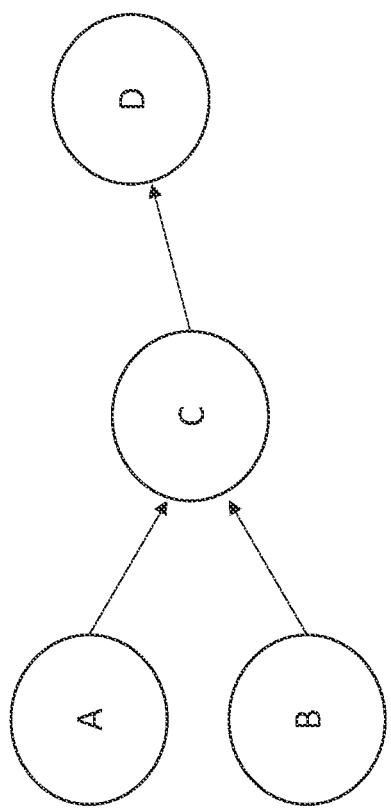
FIG. 5A illustrates an example of a push communication system.

The device management server 280 can transmit the data packet using a data channel that is used for other purposes. For instance, the device management server 280 might provide a push or pull data service. A push service (in the form of a publish/subscribe service) is illustrated by FIG. 5A. In a push service (or model), one or more data providers (A, B) publish data to a broker C. The data is then pushed by the broker C to the data receiver D based on a subscribe process performed by the data receiver D. Such subscription might involve specifying the conditions under which data is desired (e.g. a particular category or rate of data). When data is published to the broker, the broker determines which receivers are to receive the data and the data is forwarded on. As a consequence of this, there is no need for the receivers to have any knowledge of the data providers (and vice-versa). An example of a publish/subscribe services includes MQTT.

Figure 5B:
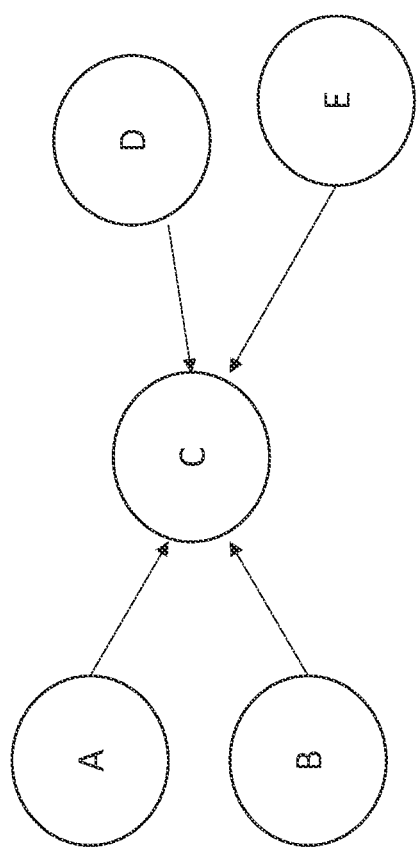
FIG. 5B illustrates an example of pull communication system.

Another example of a service that can be provided by the device management server 280 is a pull service (or model), which is illustrated in FIG. 5B. Here, data providers A, B PUT (e.g. via an HTTP POST operation) data to the data broker C. Requesters D, E then GET (e.g. via the HTTP GET operation) the data of interest from the broker C. That is to say that the data is not pre-emptively sent to the receivers D, E but must instead be proactively requested from them. PUT and GET can be implemented using HTTP(S) as described, but could also be implemented using CoAP for instance.

Using these mechanisms, the data packet can be transmitted to the receiver 190 so that an existing channel can be used for the transmission of the data packet.

FIG. 6 illustrates a pair of flowcharts 600, 625 that show a method performed by each of the sender and receiver in accordance with some examples. At a step 605, the sender obtains an outgoing SMS message 605 that corresponds with an operation to be performed. An example of RSP has already been given, but SIM over-the-air management would be another example and of course the present technique is not limited to any specific SIM management technique. Having obtained the SMS message then at step 610, the encrypted payload and receiver identifier 625 are extracted. Then, at step 615 at least some of the bytes of the outgoing SMS message are used to generate an outgoing data packet. In particular, at least the encrypted payload of the SMS message is used to generate the outgoing data packet. The outgoing data packet is then transmitted at step 620. The transmission could be directly to the sender or transmission to a server (such as a device management server) could take place.

Step 630 considers the first step performed by the receiver, which is the reception of the data packet. At a step 635, the encrypted payload is extracted. At a step 640, the encrypted payload is padded in order to form an SMS message, e.g. by the addition of headers to the encrypted payload. The SMS message is then passed to the UICC at step 640. The UICC causes the SMS message to be decrypted at step 645. Then at step 650, an action is performed as indicated by the decrypted message. For instance, in the case of an RSP message, a particular data channel could be opened. In other examples, a SIM profile could be enabled, for instance. Again, the specific action to be performed is not limiting in respect of the present technique.

As a consequence, it can be seen how management operations that typically rely on SMS messages can be achieved without the need for an active, reliable SMS network to be present. This is achieved by obtaining the encrypted payload of an SMS message that represents the specific operation to be performed, and using the encrypted payload to form an outgoing data packet, which is transmitted across a data channel towards the receiver. When the receiver receives the outgoing (now incoming) data packet, the encrypted payload is used to generate a new SMS message that represents the same encrypted payload, and this is passed to the UICC as a 'received' SMS message. As far as the UICC is concerned, the SMS has been received via an SMS channel. The decryption of the locally-generated SMS message then proceeds as for a genuinely received SMS message and any corresponding operation that is to be performed occurs.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:
1. A data processing apparatus comprising:
message obtaining circuitry configured to obtain, for transmission over a first cellular SMS communication channel to an endpoint device, an outgoing SMS message comprising an encrypted payload and an identifier corresponding to the endpoint device;
extraction circuitry configured to extract the encrypted payload from the outgoing SMS message to produce an extracted encrypted payload, and to extract the identifier corresponding to the endpoint device from the outgoing SMS message;
wrap circuitry configured to wrap bytes that make up the SMS message in the extracted identifier and in the extracted encrypted payload in an outgoing data packet that is of a type other than an SMS message; and
communication circuitry configured to transmit, to the endpoint device or a server, the outgoing data packet on a second data communication channel that is of a type other than the first cellular SMS communication channel,
wherein:
the wrap circuitry comprises translation circuitry to translate the identifier corresponding to the endpoint device to an alternative identifier corresponding to the endpoint device to be used in the outgoing data packet that is of a type other than an SMS message,
the encrypted payload and the extracted encrypted payload correspond to a secured operation for a UICC application of the endpoint device, and
the message obtaining circuitry is configured to obtain the outgoing SMS message by interception over an SMS peer to peer protocol link.
2. The data processing apparatus according to claim 1, wherein
the extraction circuitry is configured to extract only the encrypted payload and the identifier corresponding to the endpoint device from the outgoing SMS message.

3. The data processing apparatus according to claim 1, wherein
the wrap circuitry is configured to generate the outgoing data packet using only the identifier corresponding to the endpoint device and the encrypted payload from the outgoing SMS message, or data from outside the outgoing SMS message.

4. The data processing apparatus according to claim 1, wherein
at least one of the identifier corresponding to the endpoint device and the alternative identifier corresponding to the endpoint device is a subscriber identifier.

5. The data processing apparatus according to claim 1, wherein
the identifier corresponding to the endpoint device is one of: an MSISDN, an ICCID, an IMSI, and an eUICCID.

6. The data processing apparatus according to claim 1, wherein
the transmission circuitry is further configured to transmit, to the endpoint device, the outgoing SMS message.

7. The data processing apparatus according to claim 1, wherein
the communication circuitry is configured to transmit the outgoing data packet to the endpoint device via the server; and
the server is an endpoint device management service.

8. The data processing apparatus according to claim 7, wherein
the communication circuitry is further configured to communicate a further data packet via the server on the second data communication channel; and
the further data packet is for managing the transmission of data to or from the data processing apparatus.

9. The data processing apparatus according to claim 7, wherein
the server is configured to act as a broker as part of a data push communication system or as part of a data pull communication system.

10. The data processing apparatus according to claim 1, wherein
the message obtaining circuitry is configured to obtain the outgoing SMS from an SMS-enabled device; and
the SMS-enabled device is an SMS message submission device.

11. A data processing method comprising:
obtaining, for transmission over a first cellular SMS communication channel to an endpoint device, an outgoing SMS message comprising an encrypted payload and an identifier corresponding to the endpoint device;
extracting the encrypted payload from the outgoing SMS message to produce an extracted encrypted payload;
extracting the identifier corresponding to the endpoint device from the outgoing SMS message;
wrapping bytes that make up the SMS message in the extracted identifier and in the extracted encrypted payload in an outgoing data packet that is of a type other than an SMS message; and
transmitting, to the endpoint device, the outgoing data packet on a second data communication channel that is of a type other than the first cellular SMS communication channel,
wherein:
the wrapping comprises translating the identifier corresponding to the endpoint device to an alternative identifier corresponding to the endpoint device to be used in the outgoing data packet that is of a type other than an SMS message,
the encrypted payload and the extracted encrypted payload correspond to a secured operation for a UICC application of the endpoint device, and
the outgoing SMS message is obtained by interception over an SMS peer to peer protocol link.

12. An endpoint device comprising:
receiving circuitry to receive an incoming data packet on a data communication channel that is of a type other than a cellular SMS communication channel;
extraction circuitry to extract an encrypted payload from the incoming data packet that is of a type other than a cellular SMS communication channel to produce an extracted encrypted payload, wherein the encrypted payload was originally part of an SMS message, and wherein the encrypted payload and the extracted encrypted payload are both encrypted based on a cellular SMS communication protocol;
pad circuitry to pad the extracted encrypted payload to reform an encrypted SMS message by adding header information to the extracted encrypted payload; and
modem circuitry to receive the encrypted SMS message and to pass the encrypted SMS message to a UICC application included in the endpoint device;
the UICC application being configured to cause decryption of the encrypted SMS message to produce a decrypted message and to perform an action indicated by the decrypted message without the SMS message having to be transmitted across a cellular SMS communications channel,
wherein the action includes remotely provisioning a SIM resulting in activation of a data channel or enabling a SIM profile.

13. The data processing apparatus according to claim 12, comprising:
receipt circuitry to generate a delivery report to provide a proof of receipt of the incoming data packet in response to the incoming data packet being received on the data communication channel.

14. A method for an endpoint device comprising:
receiving an incoming data packet on a data communication channel that is of a type other than a cellular SMS communication channel;
extracting an encrypted payload from the incoming data packet that is of a type other than a cellular SMS communication channel to produce an extracted encrypted payload, wherein the encrypted payload was originally part of an SMS message, and wherein the encrypted payload and the extracted encrypted payload are both encrypted based on a cellular SMS communication protocol;
padding the extracted encrypted payload to reform an encrypted SMS message by adding header information to the extracted encrypted payload;
passing the encrypted SMS message to a UICC application included in the endpoint device;
the UICC application causing decryption of the encrypted SMS message to produce a decrypted message without the SMS message having to be transmitted across a cellular SMS communications channel; and
performing an action indicated by the decrypted message without the SMS message having to be transmitted across a cellular SMS communications channel,
wherein the action includes remotely provisioning a SIM resulting in activation of a data channel or enabling a SIM profile.

* * * * *